United States Patent
Melamed

(10) Patent No.: US 11,430,342 B2
(45) Date of Patent: Aug. 30, 2022

(54) FLIGHT PLANNING SYSTEM AND METHOD FOR INTERCEPTION VEHICLES

(71) Applicant: Iron Drone Ltd., Tel Aviv (IL)

(72) Inventor: Matan Melamed, Tel Aviv (IL)

(73) Assignee: Iron Drone Ltd., Tel Aviv (IL)

( * ) Notice: Subject to any disclaimer, the term of this patent is extended or adjusted under 35 U.S.C. 154(b) by 183 days.

(21) Appl. No.: 16/272,619

(22) Filed: Feb. 11, 2019

(65) Prior Publication Data

US 2019/0180632 A1 Jun. 13, 2019

Related U.S. Application Data

(63) Continuation of application No. PCT/US2017/046697, filed on Aug. 14, 2017.
(Continued)

(51) Int. Cl.
*G08G 5/00* (2006.01)
*G05D 1/00* (2006.01)
*G05D 1/10* (2006.01)

(52) U.S. Cl.
CPC ........... *G08G 5/0039* (2013.01); *G08G 5/006* (2013.01); *G08G 5/0013* (2013.01);
(Continued)

(58) Field of Classification Search
CPC ...................................................... F41H 11/02
See application file for complete search history.

(56) References Cited

U.S. PATENT DOCUMENTS 9,085,362 B1 * 7/2015 Kilian .................. B64F 1/02
9,405,296 B2 * 8/2016 Levien ................ B64C 39/024
(Continued)

FOREIGN PATENT DOCUMENTS

JP 2014163562 A * 9/2014
RU 2214934 C2 10/2003
(Continued)

OTHER PUBLICATIONS

The Extended European Search Report for European Patent Application No. 17868873.5, dated Mar. 25, 2020, EPO, Munich, Germany.
(Continued)

*Primary Examiner* — Aniss Chad
*Assistant Examiner* — Jennifer M Anda
(74) *Attorney, Agent, or Firm* — M&B IP Analysts, LLC

(57) ABSTRACT

A system and method for flight planning for a first vehicle. The method includes generating, based on an entry indicator, a first flight plan for the first vehicle, wherein the entry indicator indicates entrance of a second vehicle into a protected area, wherein the first flight plan includes collection, by the first vehicle, of at least two multimedia content elements showing the second vehicle; generating, based on the at least two multimedia content elements showing the second vehicle and at least one set of predetermined multimedia content elements showing known hostile vehicles, at least one hostility indicator analytic, wherein the at least one hostility indicator analytic includes at least a speed and a direction; and generating, based on the at least one hostility indicator analytic, a second flight plan for the first vehicle, wherein the second flight plan includes intercepting the second vehicle using the first vehicle.

20 Claims, 5 Drawing Sheets

Related U.S. Application Data

(60) Provisional application No. 62/374,854, filed on Aug. 14, 2016.

(52) U.S. Cl.
CPC ......... *G08G 5/0034* (2013.01); *G08G 5/0069* (2013.01); *G08G 5/0078* (2013.01); *G08G 5/0082* (2013.01)

(56) References Cited

U.S. PATENT DOCUMENTS

| | | | |
|---|---|---|---|
| 9,524,648 B1* | 12/2016 | Gopalakrishnan | H04K 3/224 |
| 11,112,787 B2* | 9/2021 | Peebles | F41G 3/145 |
| 2007/0023582 A1 | 2/2007 | Steele et al. | |
| 2009/0219393 A1 | 9/2009 | Vian et al. | |
| 2010/0286859 A1 | 11/2010 | Feigh et al. | |
| 2012/0210853 A1* | 8/2012 | Abershitz | F41H 11/00 89/1.11 |
| 2016/0023760 A1 | 1/2016 | Goodrich | |
| 2016/0171896 A1 | 6/2016 | Buchmueller et al. | |
| 2017/0059692 A1* | 3/2017 | Laufer | F41G 7/2253 |

FOREIGN PATENT DOCUMENTS

| | | |
|---|---|---|
| RU | 2254542 C1 | 6/2005 |
| RU | 2469408 C1 | 12/2012 |

OTHER PUBLICATIONS

The International Search Report and The Written Opinion for PCT/US2017/046697, ISA/RU, Moscow, Russia, dated Jul. 12, 2018.

* cited by examiner

FLIGHT PLANNING SYSTEM AND METHOD FOR INTERCEPTION VEHICLES

CROSS-REFERENCE TO RELATED APPLICATIONS

This application is a continuation of International Application No. PCT/US2017/046697 filed on Aug. 14, 2017 which claims the benefit of U.S. Provisional Application No. 62/374,854 filed on Aug. 14, 2016, the contents of which are hereby incorporated by reference.

TECHNICAL FIELD

The present disclosure relates generally to flight planning systems, and more particularly to planning routes for intercepting vehicles.

BACKGROUND

Unmanned aerial vehicles (UAVs) are seeing increasing industry use due to improvements in artificial intelligence, battery life, computational power, and more. Control of UAVs may be complicated due to the need to balance autonomous and manual control. Control over UAVs becomes increasingly complicated when controlling a fleet of UAVs.

UAVs provide opportunities for delivering packages, monitoring locations that are difficult to navigate by ground, and other activities related to providing assistance to people. Unfortunately, use of UAVs has also become more popular among people with criminal intentions. Some publications indicate that UAVs are being utilized for drug trafficking, placing explosive devices, smuggling contraband into forbidden areas, and the like.

Some existing solutions have been introduced to jam hostile UAVs, or to hack hostile UAVs for purposes of interception and disruption. These solutions require vast knowledge of radio frequency links, frequencies, protocol, and the like, of the specific model of the hostile UAV. Further, jamming may be impractical, as jamming all frequency bands is nearly impossible, and jammers may not be safely or conveniently utilized in locations such as urban areas and airports. Other solutions require detecting hostile UAVs, for example using video monitoring, and manually controlling a vehicle to intercept the UAV. Even when the intercepting vehicle is controlled remotely, the manual control is subject to human error that can result in dangerous conditions or failure to intercept.

It would therefore be advantageous to provide a solution that would overcome the challenges noted above. In particular, it would be advantageous to provide a solution for enabling interception of hostile vehicles, and it would be further advantageous if such a solution would not require manual control.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for flight planning for an interception vehicle. The interception vehicle is a first vehicle. The method includes generating, based on an entry indicator, a first flight plan for the first vehicle, wherein the entry indicator indicates entrance of a second vehicle into a protected area, wherein the first flight plan includes collection, by the first vehicle, of at least two multimedia content elements showing the second vehicle; generating, based on the at least two multimedia content elements showing the second vehicle and at least one set of predetermined multimedia content elements showing known hostile vehicles, at least one hostility indicator analytic, wherein the at least one hostility indicator analytic includes at least a speed and a direction of the second vehicle; and generating, based on the at least one hostility indicator analytic, a second flight plan for the first vehicle, wherein the second flight plan includes intercepting the second vehicle using the first vehicle.

Certain embodiments disclosed herein also include a non-transitory computer readable medium having stored thereon causing a processing circuitry to execute a process for flight planning for a first vehicle, the process comprising: generating, based on an entry indicator, a first flight plan for the first vehicle, wherein the entry indicator indicates entrance of a second vehicle into a protected area, wherein the first flight plan includes collection, by the first vehicle, of at least two multimedia content elements showing the second vehicle; generating, based on the at least two multimedia content elements showing the second vehicle and at least one set of predetermined multimedia content elements showing known hostile vehicles, at least one hostility indicator analytic, wherein the at least one hostility indicator analytic includes at least a speed and a direction of the second vehicle; and generating, based on the at least one hostility indicator analytic, a second flight plan for the first vehicle, wherein the second flight plan includes intercepting the second vehicle using the first vehicle.

Certain embodiments disclosed herein also include a system for flight planning for an interception vehicle. The interception vehicle is a first vehicle. The system comprises: a processing circuitry; and a memory, the memory containing instructions that, when executed by the processing circuitry, configure the system to: generate, based on an entry indicator, a first flight plan for the first vehicle, wherein the entry indicator indicates entrance of a second vehicle into a protected area, wherein the first flight plan includes collection, by the first vehicle, of at least two multimedia content elements showing the second vehicle; generate, based on the at least two multimedia content elements showing the second vehicle and at least one set of predetermined multimedia content elements showing known hostile vehicles, at least one hostility indicator analytic, wherein the at least one hostility indicator analytic includes at least a speed and a direction of the second vehicle; and generate, based on the at least one hostility indicator analytic, a second flight plan for the first vehicle, wherein the second flight plan includes intercepting the second vehicle using the first vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
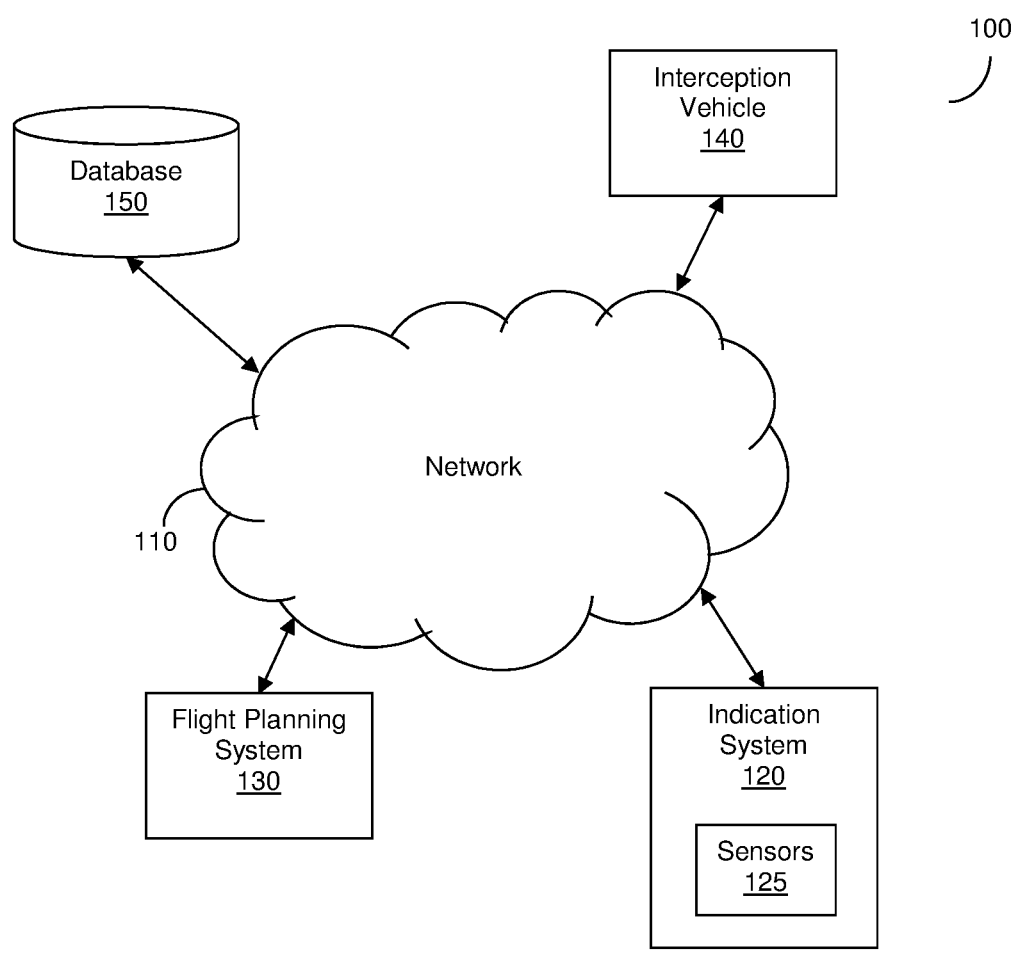
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for planning flight routes of interception vehicles utilized to intercept hostile vehicles. An indication of entry of a potentially hostile vehicle into a predetermined area is received. A location pointer associated with the entry into the predetermined area is received and metadata for the potentially hostile vehicle is generated. When the potentially hostile vehicle is determined to be a hostile vehicle, a flight plan for intercepting the hostile vehicle using an interception vehicle is generated and the interception vehicle is configured based on the generated flight plan.

FIG. 1 shows an example network diagram 100 utilized to describe the various disclosed embodiments. In the example network diagram 100, an indication system 120, a flight planning system 130, an interception vehicle 140, and a database 150, are communicatively connected via a network 110. The network 110 may be, but is not limited to, a wireless, cellular or wired network, a local area network (LAN), a wide area network (WAN), a metro area network (MAN), the Internet, the worldwide web (WWW), non-IP based networks, dedicated RF links, similar networks, and any combination thereof.

The indication system 120 is configured to identify vehicles entering into or expected to enter into a protected area. The vehicles entering into the protected area may be considered to be hostile vehicles by default, or may be considered to be potentially hostile vehicles until it is determined whether the entering vehicle is hostile or not based on monitoring. The protected area may be a predetermined area, and may be, but is not limited to, a geographic location, an airspace, a combination thereof, and the like. To this end, the protected area may be defined with respect to a geographic location pointer and a distance (e.g., a radius around a geographic location), an array of geographic location pointers, a vector of geographic location pointers, a three-dimensional space, and the like. In an example implementation, the indication system 120 is configured to identify flying vehicles such as unmanned aerial vehicles (e.g., drones) entering the protected area.

The indication system 120 may be, for example, an alert system such as a radar system, an acoustic detection system, an image-based detection system (e.g., a system utilizing machine vision on images to identify entering vehicles), a combination thereof, and the like. The indication system 120 may be configured to identify a location of each identified vehicle, and may be further configured to identify a general direction of movement of each identified vehicle. In some implementations, the indication system 120 may be manually operated.

The indication system 120 includes one or more sensors 125 configured to capture signals related to the protected area (e.g., signals indicating the presence of objects within the protected area such as image signals illustrating the protected area, radar signals, and the like). The sensors 125 may include ground sensor, aerial sensors, or both, deployed within or in proximity to the protected area.

The interception vehicle 140 may be, but is not limited to, an unmanned aerial vehicle (UAV), a remote-piloted vehicle (RPV), a drone, and the like. The interception vehicle 140 may have a flying configuration such as, but not limited to, multi-rotor, fixed-wing, rotating wing, and the like. The interception vehicle 140 includes a propulsion system (not shown in FIG. 1), and is configured to move, using the propulsion system, based on flight plans generated by the flight planning system 130. The interception vehicle 140 may be further configured to monitor by capturing multimedia content, to intercept a hostile vehicle, or both. To this end, the interception vehicle 140 may include one or more sensors, an interception apparatus, or both. An example schematic diagram of the interception vehicle 140 is described further herein below with respect to FIG. 3.

The database 150 may store predetermined vehicle analytics associated with known hostile vehicles, flight planning rules for generating optimal flight plans based on multimedia content, or both. The predetermined vehicle analytics may be compared to hostility indicator analytics determined based on analysis of multimedia content to determine whether a potentially hostile vehicle is hostile.

In an embodiment, the flight planning system 130 is configured to receive, from the indication system 120, an entry indicator that a potentially hostile vehicle has entered the protected area. The entry indicator may include a location pointer of the potentially hostile vehicle, and may further include an entry point. The entry point is a location within the predetermined area in which the potentially hostile vehicle entered the protected area.

The entry indicator may further include an uncertainty factor representing the accuracy of the indication system 120. The uncertainty factor may be, for example, a difference (delta) in location that must be crossed to arrive at the location of the potentially hostile vehicle. The difference may be between the location pointer of the entry indicator and a location pointer of an actual location of the potentially hostile vehicle, and may be, but is not limited to, a distance, a direction of the distance (e.g., a Cardinal direction, an angle from a base direction, a direction in three-dimensional space, etc.), or both. The uncertainty factor may be based on, for example, the time of entry, a delay, or a combination thereof. For example, the uncertainty factor may indicate an estimated actual location of the potentially hostile vehicle expressed as 100 feet North of the location pointer. The uncertainty factor may be utilized to plan flights for the interception vehicle 140.

In an embodiment, based on the entry indicator, the flight planning system 130 is configured to generate a first monitoring flight plan for monitoring the potentially hostile vehicle using the interception vehicle 140. The monitoring flight plan may include, but is not limited to, moving the interception vehicle 140 to a location in proximity to (e.g., within a predetermined threshold distance of) the potentially hostile vehicle and capturing two or more multimedia content elements showing the potentially hostile vehicle. The monitoring flight plan may be based on the location pointer of the interception vehicle 140, the entry point, the time of entry, a current time, the uncertainty factor, or a combination thereof. The flight planning system 130 may be configured to send the generated monitoring flight plan to the interception vehicle 140, thereby causing the interception vehicle 140 to execute the monitoring flight plan.

In an embodiment, the flight planning system 130 is configured to receive the multimedia content elements captured by the interception vehicle 140 during a monitoring phase in which the interception vehicle 140 executed the monitoring flight plan. The flight planning system 130 may also be configured to receive metadata associated with the multimedia content elements such as, but not limited to, one or more location pointers (e.g., of the interception vehicle 140 when each multimedia content element was captured), one or more associated timestamps, and the like.

In an embodiment, the flight planning system 130 is configured to analyze the received multimedia content elements, metadata, or both, and to determine one or more hostility indicator analytics for the potentially hostile vehicle. The hostility indicator analytics may include, but are not limited to, movement patterns, visual characteristics of the potentially hostile vehicle, and other analytics that may be indicative of whether a vehicle is hostile. The visual characteristics may include, for example, markings on the potentially hostile vehicle (e.g., a symbol of a hostile entity), an object being transported by the potentially hostile vehicle, and the like. The movement patterns may indicate speeds, directions, and the like. To this end, the analysis may include machine imaging of the multimedia content, machine learning based on the multimedia content and associated metadata, or both.

Analyzing multiple multimedia content elements may allow for determining patterns of movement of the potentially hostile vehicle. In particular, results of analysis of multiple multimedia content elements showing the potentially hostile vehicle may be utilized to determine speed and direction of the potentially hostile vehicle. For example, based on images showing the potentially hostile vehicle at a first location pointer and at a second location pointer that is 200 meters East of the first location pointer captured 20 seconds apart, speed and direction of the potentially hostile vehicle may be determined as 10 meters/second eastward.

In an embodiment, based on the hostility indicator analytics, the flight planning system 130 is configured to determine whether the potentially hostile vehicle is hostile. To this end, the flight planning system 130 may be further configured to compare the hostility indicator analytics to predetermined analytics of known hostile vehicles stored in the database 150. Alternatively, the interception vehicle 140 may be configured to determine whether the potentially hostile vehicle is hostile.

The known hostile vehicle analytics may include, but are not limited to, colors, markings, suspicious cargo (e.g., drugs, explosive devices, etc.), suspicious movement patterns (e.g., known movement patterns of vehicles attempting to deliver drugs or weapons), and the like. For example, based on a visual characteristic including a known logo of a terrorist organization shown in an image of the potentially hostile vehicle, it is determined that the vehicle is hostile. As another example, based on movement patterns of the potentially hostile vehicle that match known movement patterns of hostile vehicles above a predetermined threshold, it is determined that the vehicle is hostile. In some implementations, every vehicle entering the protected area is considered to be hostile.

In an embodiment, the flight planning system 130 is configured to generate a second intercepting flight plan for intercepting a vehicle determined to be hostile based on the entry indicator, the hostility indicator analytics, or both. The intercepting flight plan may include, but is not limited to, location coordinates, one or more speeds, maneuvering instructions, instructions to activate or otherwise control an interception apparatus, a type of interception vehicle or interception apparatus to be utilized for the interception, a combination thereof, and the like. In an example implementation, the interception may be achieved using, for example, a fiber, a stream of fiber, or another interception apparatus. The flight planning system 130 may be configured to query the database 150 when the database 150 includes flight planning rules. The intercepting flight plan may be generated using the flight planning rules.

The intercepting flight plan may be generated based further on a type of the interception vehicle 140. Accordingly, different types of interception vehicles may be utilized, or different routes may be utilized for different types of interception vehicles. The type of the interception vehicle may be defined with respect to, for example, a mode of locomotion, an interception apparatus, and the like. The interception apparatus may include, for example, metal balls, a chemical composition (e.g., an adhesive or corrosive composition), a net, a launcher, a fiber, a stream of fiber, a combination thereof, and the like. For example, an intercepting flight plan for an interception vehicle including a net may include moving to the location of the hostile vehicle in order to capture the hostile vehicle in the net, while an intercepting flight plan for an interception vehicle including an adhesive composition launcher may include moving to a location in proximity to the hostile vehicle and launching the adhesive composition toward the hostile vehicle.

In an embodiment, the flight planning system 130 is configured to send the generated intercepting flight plan to the interception vehicle 140, and the interception vehicle 140 is configured to intercept the hostile vehicle by executing the intercepting flight plan. The flight planning system may be further configured to configure the interception vehicle 140 to execute the intercepting flight plan.

In an embodiment, the flight planning system 130 may be configured to continuously (e.g., repeatedly at predetermined time intervals) check to determine whether the intercepting flight plan is still optimal and, when it is determined that the intercepting flight plan is not still optimal, a third updated intercepting flight plan may be generated. The determination of whether the intercepting flight plan is still optimal may be based on subsequently received indicators from the indication system 120, sensor signals captured by the interception vehicle 140, or both.

It should be noted that the embodiments described herein with respect to FIG. 1 are discussed as using a single interception vehicle 140 for both monitoring and intercepting of the hostile vehicle merely for simplicity purposes and without limitation on the disclosed embodiments. In some embodiments, different vehicles may be utilized for monitoring and intercepting, respectively. As a particular example, if a first intercepting vehicle used for monitoring a hostile vehicle is not equipped with a type of interception apparatus indicated in the intercepting flight plan, a second intercepting vehicle equipped with an interception apparatus of the indicated type. For example, if a first intercepting vehicle having a spear monitors a hostile vehicle equipped with an explosive device in a residential area, a second intercepting vehicle having an adhesive launcher may be utilized for the interception, thereby avoiding or minimizing harm to civilian people or property.

Moreover, it should also be noted that multiple interception vehicles may be equally utilized for intercepting a single hostile vehicle without departing from the scope of the disclosure. Furthermore, it should be noted that certain portions of an area may be more sensitive than other portions, and that the flight plans may be generated accordingly.

Figure 2:
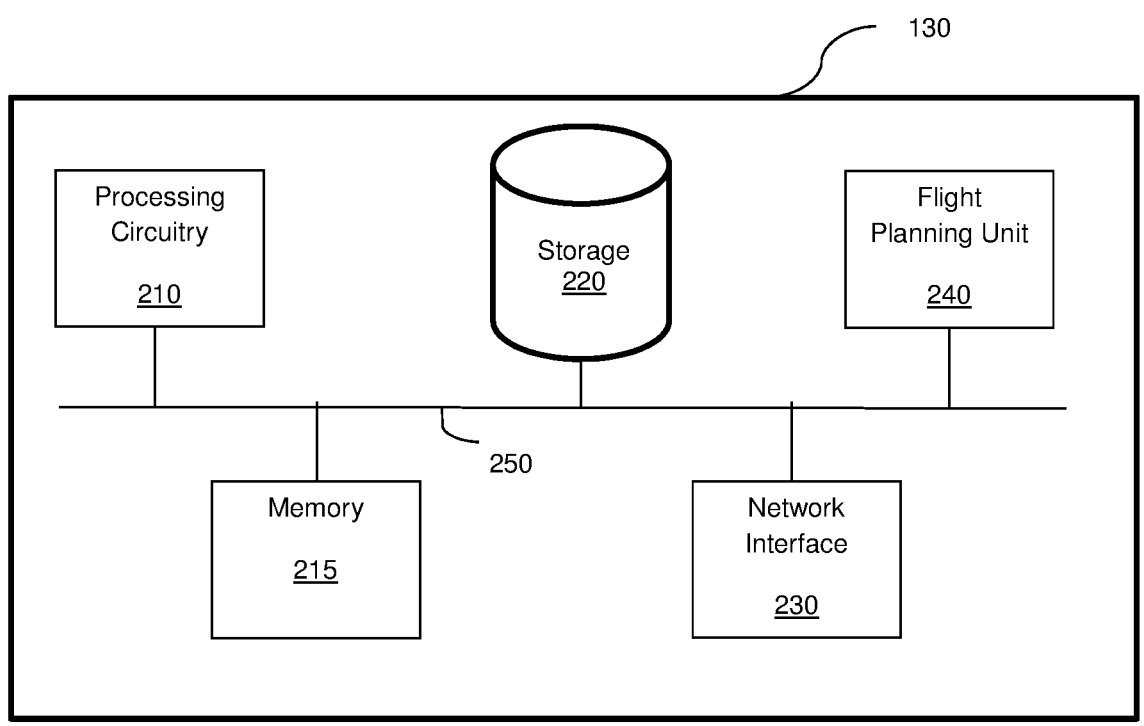
FIG. 2 is a schematic diagram of a flight planning system according to an embodiment.

FIG. 2 is an example schematic diagram of the flight planning system 130 according to an embodiment. The flight planning system 130 includes a processing circuitry 210 coupled to a memory 215, a storage 220, a network interface 230, and a flight planning unit 240. The components of the flight planning system 130 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to generate flight plans for interception vehicles, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The network interface 230 allows the flight planning system 130 to communicate with the indication system 120, the database 150, the interception vehicle 140, or a combination of, for the purpose of, for example, receiving indications of entry, sending flight plans, and the like. The network interface 230 may include various transceivers, thereby enabling communication via, for example, satellite, radio frequency channels, cellular networks, and the like. The radio frequency channels may include, but are not limited to, LoRa, SIGFOX, and the like.

The flight planning unit 240 is configured to generate flight plans as described herein. The flight plans are optimal flight plans for causing an interception vehicle (e.g., the interception vehicle 140) to intercept a hostile vehicle. The flight plans generated by the flight planning unit 240 are sent to the interception vehicle via the network interface 230.

It should be understood that the embodiments described herein are not limited to the specific architecture illustrated in FIG. 2, and other architectures may be equally used without departing from the scope of the disclosed embodiments.

Figure 3:
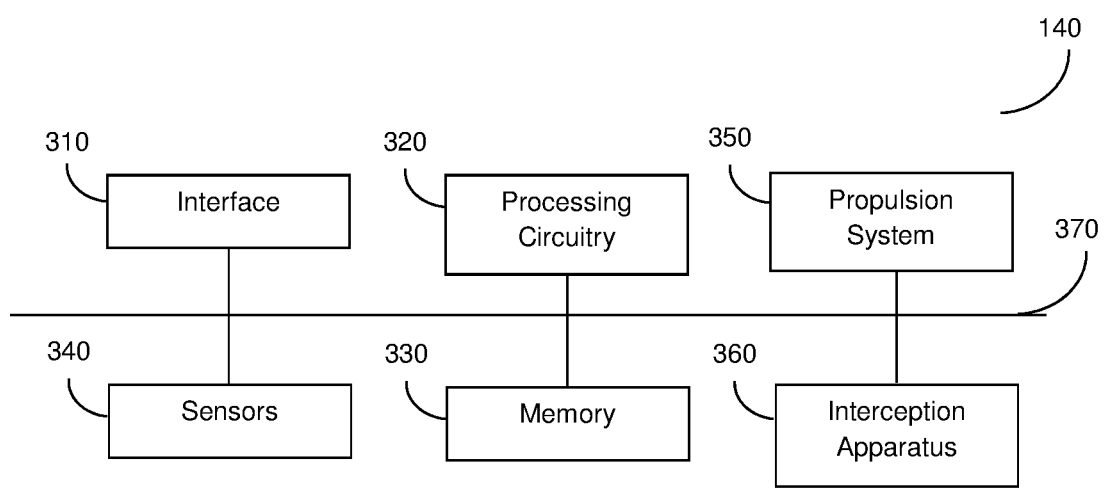
FIG. 3 is a schematic diagram of a vehicle control system according to an embodiment.

FIG. 3 is an example schematic diagram of the interception vehicle 140 according to an embodiment. The interception vehicle 140 may be, but is not limited to, an unmanned aerial vehicle, a remote-piloted vehicle, a drone, and the like. During operation, the interception vehicle 140 intercepts a hostile vehicle that has entered a predetermined area. In an embodiment, the interception vehicle 140 includes an interface 310, a processing circuitry 320, a memory 330, one or more sensors 340, a propulsion system 350, and an interception apparatus (IA) 360.

The interface 310 may provide network connectivity for the interception vehicle 140. To this end, the interface 310 may include various transceivers, thereby enabling communication via, for example, satellite, radio frequency channels, cellular networks, and the like. The radio frequency channels may include, but are not limited to, LoRa, SIGFOX, and the like. The interface 310 allows the interception vehicle 140 to, for example, receive flight plans to be executed via the interception control vehicle.

The processing circuitry 320 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 320 is connected by a bus 370 to the memory 330. The memory 330 may be volatile (e.g., RAM, etc.), non-volatile (e.g., ROM, flash memory, etc.), or a combination thereof. The memory 330 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing circuitry 320 to control locomotion of the interception vehicle based on a received flight plan.

In some implementations, the memory 330 may contain instructions that, when executed by the processing circuitry 320, configure the processing circuitry 320 to perform the embodiments disclosed herein. Specifically, the processing circuitry 320 may be configured to detect hostile vehicles and generate flight plans for intercepting hostile vehicles in accordance with the disclosed embodiments.

The sensors 340 may include image-based sensors such as, but are not limited to, an infrared (IR) capturing device, a still camera, a video camera, a combination thereof, and the like. The sensors 340 may also include a radar or other navigation system. The sensors 340 are configured to capture signals related to the interception vehicle 140 to be utilized for, e.g., flight planning. For example, the sensor signals may be utilized to determine a flight path for intercepting a hostile vehicle within a predetermined area.

The propulsion system 350 is configured to control locomotion and other movements of the interception vehicle 140. To this end, the propulsion system 350 may include or be connected to, but is not limited to, motors, propellers, engines, and the like. During operation, the propulsion system 350 may be configured to receive commands from the processing circuitry 320 to be executed in order to control the interception vehicle 140 in accordance with a flight plan.

The interception apparatus 360 is configured to control one or more interception tools utilized for intercepting hostile vehicles. To this end, the interception apparatus 360 may include or be connected to one or more static parts, one or more moving parts, or both. Example static parts may include, but are not limited to, a net, a metal object, a spear, and the like. The moving parts may be automatically or semi-automatically controlled, and may be, for example, a launcher controlled via the processing circuitry 320 to launch an interception object such as a net, a metal ball, an adhesive substance (e.g., glue), and the like. During operation, the static parts, moving parts, or both, are utilized to disrupt movement of the hostile vehicle, for example by capturing the hostile vehicle, destroying at least part of the hostile vehicle, affixing the hostile vehicle to a fixed structure, and the like.

Figure 4:
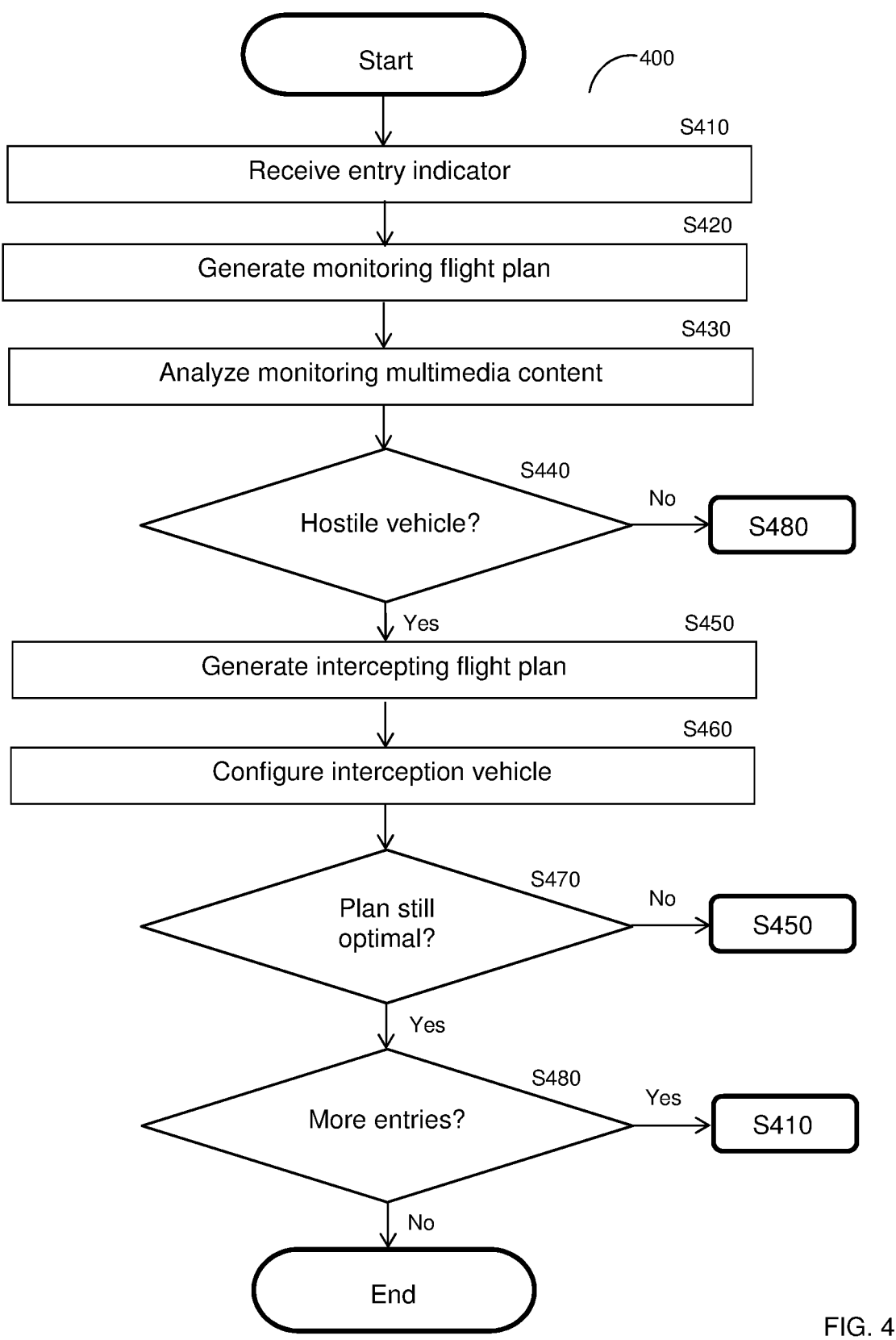
FIG. 4 is a flowchart illustrating a method for generating a flight plan for an interception vehicle according to an embodiment.

FIG. 4 is an example flowchart 400 illustrating a method for generating flight plans for an interception vehicle according to an embodiment. In an embodiment, the method may be performed by the flight planning system 130. In another embodiment, the method may be performed by the interception vehicle 140.

At S410, an entry indicator that a potentially hostile vehicle has entered a protected area is received. The protected area may be predetermined, and may be, for example, a geographical location or locations. The entry indicator may be received from an indication system including one or more vehicle detectors. The entry indicator includes metadata indicating, for example, one or more location pointers associated with the potentially hostile vehicle, one or more associated timestamps, a location point of an entry point, an uncertainty factor representing an accuracy of the indication system, a combination thereof, and the like.

At S420, a first monitoring flight plan is generated for an interception vehicle to monitor the potentially hostile vehicle. In an embodiment, S420 may further include sending the generated monitoring flight plan to the interception vehicle. The first monitoring flight plan may include moving the interception vehicle within a threshold distance of the potentially hostile vehicle, hovering in proximity to the potentially hostile vehicle, capturing multimedia content elements showing the potentially hostile vehicle, a combination thereof, and the like. The multimedia content elements may include, but is not limited to, an image, a graphic, a video stream, a video clip, a vide frame, a photograph, an image of signals, and the like. The images may include visible light images, infrared images, and the like. The multimedia content elements may illustrate, for example, movements of the potentially hostile vehicle, objects affixed to or otherwise transported by the potentially hostile vehicle, labels or other markings of the potentially hostile vehicle, and the like.

At S430, multimedia content captured by the interception vehicle is analyzed to generate one or more hostility indicator analytics. In an embodiment, S430 includes receiving, from the interception vehicle, the captured multimedia content elements, associated metadata, or both. The associated metadata may include, but is not limited to, location pointers, timestamps, and the like. The analysis may include, but is not limited to, using machine imaging to identify data in the multimedia content, using the multimedia content as inputs to a machine learning model, or both. The hostility indicator analytics may include, but are not limited to, movement patterns, visual characteristics (e.g., markings on the vehicle or objects transported by the vehicle), location pointers, and the like.

In an embodiment, two or more multimedia content elements (e.g., two or more images, two or more videos, a video and one or more images, etc.) are analyzed. The multimedia content elements may include, but are not limited to, images, videos, portions thereof, and the like. Analyzing multiple multimedia content elements allows for determining movement patterns of the potentially hostile vehicle, and may specifically allow for determining such movement patterns with respect to at least direction and speed of the potentially hostile vehicle.

At optional S440, based on the hostility indicator analytics, it is determined whether the potentially hostile vehicle is a hostile vehicle and, if so, execution continues with S450; otherwise, execution continues with S480. In an embodiment, S440 may include comparing the hostility indicator analytics to predetermined analytics of known hostile vehicles. Accordingly, in some implementations, only vehicles that are determined to be hostile may be intercepted. Alternatively, all vehicles entering the protected area may be considered to be hostile and, therefore, may be intercepted. For example, when the protected area is an airport, any vehicle entering the protected area may threaten safety of people at the airport, and should therefore be treated as hostile and intercepted.

At S450, based on the hostility indicator analytics, a second intercepting flight plan for intercepting the hostile vehicle is generated. The second intercepting flight plan may include one or more sets of location coordinates, one or more speeds, one or more directions, activating or otherwise using an interception apparatus, and the like.

In an embodiment, S450 includes querying a database with respect to the hostility indicator analytics for one or more flight planning rules for generating optimal flight plans for intercepting hostile vehicles. The flight planning rules may be applied to the entry indicator, the hostility indicator analytics, or both.

In an embodiment, the intercepting flight plan may be generated in real-time during the monitoring of the hostile vehicle as multimedia content elements are captured. Accordingly, the intercepting flight plan may be generated based on the current location of the hostile vehicle, for example a location of the hostile vehicle within a predetermined period of time (e.g., a second or fraction thereof). Moreover, the intercepting flight plan may include moving to an expected location of the hostile vehicle based on the current location and the movement patterns. For example, based on a speed and direction of the hostile vehicle and its current location, an expected location in 5 seconds may be determined and the intercepting flight plan may include navigating to the expected location or a proximate location within 5 seconds. This allows for successfully intercepting the hostile vehicle as it moves.

At S460, the interception vehicle is configured to execute the intercepting flight plan. In an embodiment, S460 includes sending the intercepting flight plan to the interception vehicle.

At optional S470, it is determined whether the intercepting flight plan is still optimal for intercepting the hostile vehicle and, if so, execution continues with S480; otherwise, execution continues with S450 and a third updated intercepting flight plan is generated for the interception vehicle. The updated intercepting flight plan may include location coordinates of a current location of the hostile vehicle to be intercepted. In some implementations, it may be continuously determined whether the current intercepting flight plan is still optimal until a predetermined event is detected (e.g., successful interception, the hostile vehicle leaving the protected area, and the like).

The determination and subsequent updates may be performed in real-time during monitoring of the hostile vehicle as multimedia content elements are captured, thereby allowing for altering intercepting flight plans to account for unexpected movements or unsuccessful interceptions.

At S480, it is determined whether additional indicators have been received and, if so, execution continues with S410; otherwise execution terminates. Accordingly, newly entering vehicles may be detected as they enter the protected area, and appropriate intercepting actions may be taken for each. In some implementations, different intercepting vehicles may be utilized to intercept different hostile vehicles, thereby allowing for use of methods of interception that are suitable for different types of hostile vehicles. Additionally, multiple entry indicators may be detected and analyzed simultaneously, thereby allowing for simultaneous interception of potentially hostile vehicles by different interception vehicles.

Figure 5:
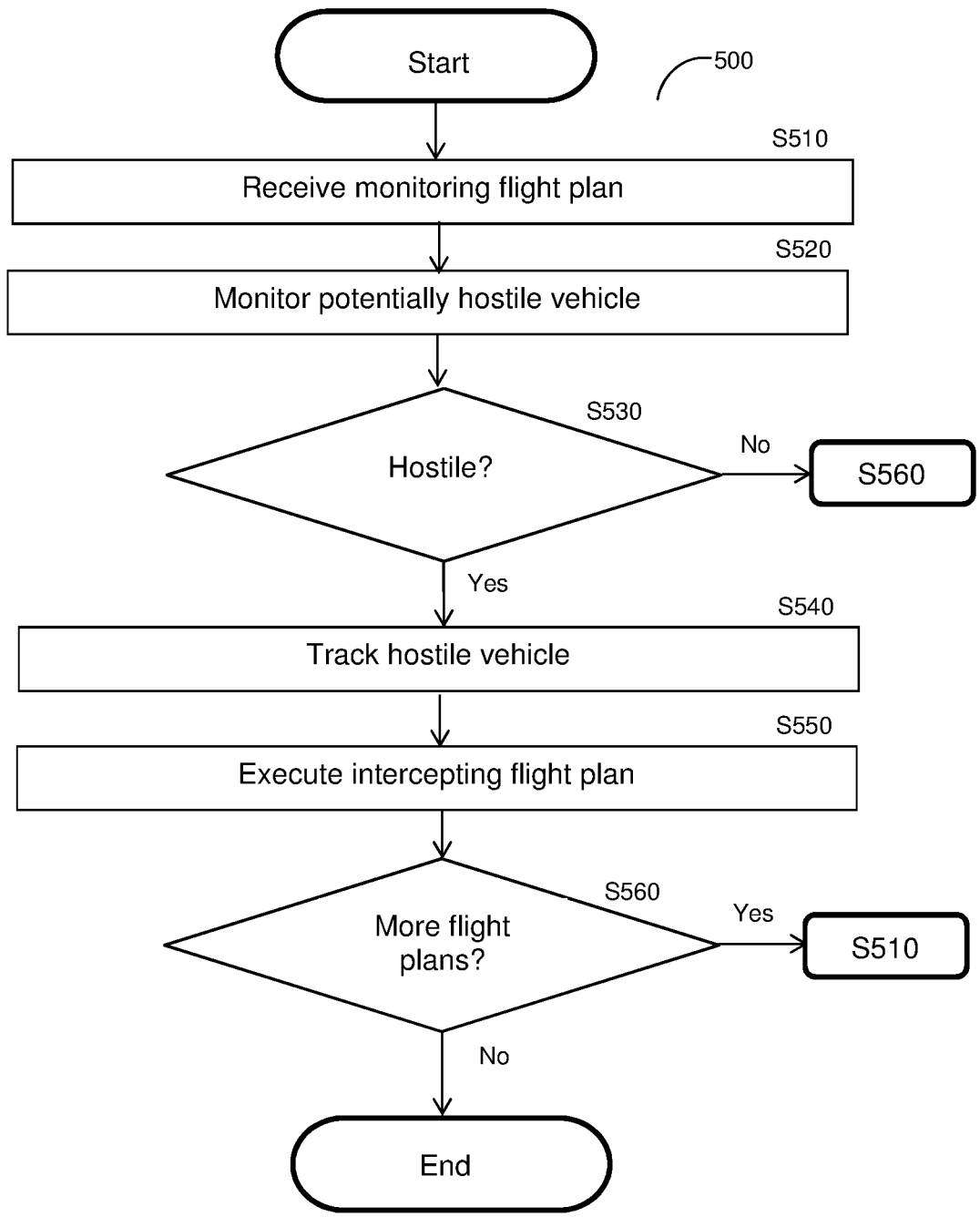
FIG. 5 is a flowchart illustrating a method for verifying a potentially hostile vehicle according to an embodiment.

FIG. 5 is an example flowchart 500 illustrating a method for intercepting hostile vehicles according to an embodiment. In an embodiment, the method may be performed by the interception vehicle 140 based on flight plans generated by the flight planning system 130.

At S510, a monitoring flight plan is received. The monitoring flight plan may be received when a new potentially hostile vehicle enters a protected area. The monitoring flight plan includes at least moving within proximity (e.g., within a predetermined threshold distance) of the potentially hostile vehicle, capturing multimedia content elements, and the like.

At S520, the received monitoring flight plan is executed and the potentially hostile vehicle is monitored. During the monitoring, two or more multimedia content elements are captured via one or more sensors. The sensors may be, for example, image-based sensors such as cameras. In some implementations, the monitoring may include moving when the potentially hostile vehicle moves, for example when the potentially hostile vehicle moves away from the interception vehicle above a predetermined threshold distance. One or more multimedia content elements may be captured after each time the potentially hostile vehicle moves.

At optional S530, based on the monitoring, it may be determined whether the potentially hostile vehicle is hostile and, if so, execution continues with S540; otherwise, execution continues with S560. If it is determined that the potentially hostile vehicle is not hostile, a notification indicating that the vehicle is not hostile may be generated.

In an embodiment, S530 may include comparing the captured multimedia content elements to one or more predetermined multimedia content elements showing known hostile vehicles. Further, S530 may include performing image processing on the captured multimedia content elements, where the comparison is based on the results of the image processing, for example as compared to results of image processing of the known hostile vehicle multimedia content elements.

At S540, the hostile vehicle is tracked. In an embodiment, S540 may include capturing additional tracking multimedia content elements showing the hostile vehicle and sending the monitoring multimedia content elements, the tracking multimedia content elements, or both, to a flight planning system configured to generate optimal interception flight plans. The flight planning system returns an intercepting flight plan for intercepting the hostile vehicle. The intercepting flight plan may include, but is not limited to, moving the interception vehicle, controlling an interception apparatus (e.g., activating a launcher, deploying a net or spear, etc.), and the like.

At S550, the intercepting flight plan is executed and the hostile vehicle is intercepted. In some implementations, additional sensor signals may be captured and utilized to confirm that the hostile vehicle was successfully intercepted. For example, based on audio of an explosion, it may be determined that the hostile vehicle was intercepted. A notification indicating the successful interception may be generated.

At S560, it is determined whether additional flight plans have been received and, if so, execution continues with S510; otherwise, execution terminates.

It should be noted that various embodiments described herein are discussed with respect to a flight plan for a flying interception vehicle merely for simplicity purposes and without limitation on the disclosed embodiments. Ground-based (i.e., non-flying) interception vehicles may be equally utilized without departing from the scope of the disclosure, particularly when hostile vehicles are ground-based.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for flight planning for a first unmanned vehicle, comprising:
   generating, by a first computer located remote from the first unmanned vehicle, based on a received entry indicator, upon receipt of the entry indicator, a first flight plan for the first unmanned vehicle, wherein the entry indicator indicates entrance of a second vehicle into a protected area, wherein the first flight plan is programmed to command the first unmanned vehicle to collect at least two multimedia content elements showing the second vehicle and to fly the first unmanned vehicle so as to continually maintain a location of the first unmanned vehicle to be within a predefined distance from each actual current location of the second vehicle over time as the second vehicle flies;
   transmitting the first flight plan over a wireless computer network connection toward a second computer located aboard the first unmanned vehicle thereby causing the first unmanned vehicle to execute the first flight plan and so fly according to the first flight plan;
   generating, by the first computer applying a machine learning model to the at least two multimedia content elements collected by the first unmanned vehicle in view of at least one set of predetermined multimedia content elements showing hostile vehicles known to the first computer, at least one hostility indicator analytic, wherein the at least one hostility indicator analytic includes at least a speed and a direction of the second vehicle;
   generating, by the first computer, based on the at least one hostility indicator analytic, a second flight plan for the first unmanned vehicle, wherein the second flight plan is programmed to command the first unmanned vehicle to intercept the second vehicle using the first unmanned vehicle, wherein the second flight plan is generated in real-time while the first flight plan continues to be executed by the first unmanned vehicle under control of the second computer; and
   transmitting the second flight plan over the wireless computer network connection toward the second computer to be executed thereby and so replace the first flight plan and so causing the first unmanned vehicle to execute the first second plan and so fly according to the second flight plan.

2. The method of claim 1, wherein the at least one hostility indicator analytic further includes at least one of: at least one location pointer, at least one timestamp, at least one movement pattern of the second vehicle, and at least one visual characteristic of the second vehicle.

3. The method of claim 1, further comprising:
   determining, based on the at least one hostility indicator analytic, whether the second vehicle is a hostile vehicle, wherein the second flight plan is generated when the second vehicle is a hostile vehicle.

4. The method of claim 1, wherein the second flight plan is generated based further on a type of the first unmanned vehicle.

5. The method of claim 1, further comprising:
   receiving the entry indicator from an indication system, wherein the indication system is at least one of: a radar system, an acoustic detection system, and a machine vision system.

6. The method of claim 1, wherein the first unmanned vehicle is any of: an unmanned aerial vehicle and a drone.

7. The method of claim 1, wherein each multimedia content element is any of: an image, a graphic, a video stream, a video clip, a video frame, a photograph, and an image of signals.

8. The method of claim 1, wherein the protected area is defined with respect to at least one of: a geographic location pointer and a distance, an array of geographic location pointers, and a three-dimensional space.

9. The method of claim 1, further comprising:
   upon receipt of the first flight plan by the second computer over the wireless computer network connection, executing the first flight plan by the second computer so as to operate the first unmanned vehicle to fly in accordance with the first flight plan; and
   upon receipt of the second flight plan by the second computer over the wireless computer network connection, executing the second flight plan by the second computer so as to operate the first unmanned vehicle to fly in accordance with the second flight plan.

10. A non-transitory computer readable medium having stored thereon instructions for causing a processing circuitry to execute a process for flight planning for a first unmanned vehicle, the process comprising:
   generating, by a first computer located remote from the first unmanned vehicle, based on a received entry indicator, upon receipt of the entry indicator, a first flight plan for the first unmanned vehicle, wherein the entry indicator indicates entrance of a second vehicle into a protected area, wherein the first flight plan is programmed to command the first unmanned vehicle to collect at least two multimedia content elements showing the second vehicle and to fly the first unmanned vehicle so as to continually maintain a location of the first unmanned vehicle to be within a predefined distance from each actual current location of the second vehicle over time as the second vehicle flies;
   transmitting the first flight plan over a wireless computer network connection toward a second computer located aboard the first unmanned vehicle thereby causing the first unmanned vehicle to execute the first flight plan and so fly according to the first flight plan;
   generating, by the first computer applying a machine learning model to the at least two multimedia content elements collected by the first unmanned vehicle in view of at least one set of predetermined multimedia content elements showing hostile vehicles known to the first computer, at least one hostility indicator analytic, wherein the at least one hostility indicator analytic includes at least a speed and a direction of the second vehicle;
   generating, by the first computer, based on the at least one hostility indicator analytic, a second flight plan for the first unmanned vehicle, wherein the second flight plan is programmed to command the first unmanned vehicle to intercept the second vehicle using the first unmanned vehicle, wherein the second flight plan is generated in real-time while the first flight plan continues to be executed by the first unmanned vehicle under control of the second computer; and transmitting the second flight plan over the wireless computer network connection toward the second computer to be executed thereby and so replace the first flight plan and so causing the first unmanned vehicle to execute the first second plan and so fly according to the second flight plan.

11. The non-transitory computer readable medium of claim 10, further comprising:

upon receipt of the first flight plan by the second computer over the wireless computer network connection, executing the first flight plan by the second computer so as to operate the first unmanned vehicle to fly in accordance with the first flight plan; and upon receipt of the second flight plan by the second computer over the wireless computer network connection, executing the second flight plan by the second computer so as to operate the first unmanned vehicle to fly in accordance with the second flight plan.

12. A system for flight planning for a first unmanned vehicle, comprising:

a wireless network interface located remote from the first unmanned vehicle;

a processing circuitry located remote from the first unmanned vehicle; and a memory located remote from the first unmanned vehicle, the memory containing instructions that, when executed by the processing circuitry, configure the system to:

generate, based on a received entry indicator, upon receipt of the entry indicator, a first flight plan for the first unmanned vehicle, wherein the entry indicator indicates entrance of a second vehicle into a protected area, wherein the first flight plan is programmed to command the first unmanned vehicle to collect at least two multimedia content elements showing the second vehicle and to fly the first unmanned vehicle so as to continually maintain a location of the first unmanned vehicle to be within a predefined distance from each actual current location of the second vehicle over time as the second vehicle flies;

transmit the first flight plan over a wireless computer network connection implemented using the wireless network interface toward a second computer located aboard the first unmanned vehicle thereby causing the first unmanned vehicle to execute the first flight plan and so fly according to the first flight plan;

generate, by applying a machine learning model to the at least two multimedia content elements collected by the first unmanned vehicle in view of at least one set of predetermined multimedia content elements showing hostile vehicles known to the processing circuitry, at least one hostility indicator analytic, wherein the at least one hostility indicator analytic includes at least a speed and a direction of the second vehicle;

generate, based on the at least one hostility indicator analytic, a second flight plan for the first unmanned vehicle, wherein the second flight plan is programmed to command the first unmanned vehicle to intercept the second vehicle using the first unmanned vehicle, wherein the second flight plan is generated in real-time while the first flight plan continues to be executed by the first unmanned vehicle under control of the second computer; and transmit the second flight plan over the wireless computer network connection toward the second computer to be executed thereby and so replace the first flight plan and so cause the first unmanned vehicle to execute the second plan and so fly according to the second flight plan.

13. The system of claim 12, wherein the at least one hostility indicator analytic further includes at least one of: at least one location pointer, at least one time pointer, at least one movement pattern of the second vehicle, and at least one visual characteristic of the second vehicle.

14. The system of claim 12, wherein the system is further configured to:

determine, based on the at least one hostility indicator analytic, whether the second vehicle is a hostile vehicle, wherein the second flight plan is generated when the second vehicle is a hostile vehicle.

15. The system of claim 12, wherein the second flight plan is generated based further on a type of the first unmanned vehicle.

16. The system of claim 12, wherein the system is further configured to:

receive the entry indicator from an indication system, wherein the indication system is at least one of: a radar system, an acoustic detection system, and a machine vision system.

17. The system of claim 12, wherein the first unmanned vehicle is any of: an unmanned aerial vehicle, a remote-piloted vehicle, and a drone.

18. The system of claim 12, wherein each multimedia content element is any of: an image, a graphic, a video stream, a video clip, a video frame, a photograph, and an image of signals.

19. The system of claim 12, wherein the protected area is defined with respect to at least one of: a geographic location pointer and a distance, an array of geographic location pointers, and a three-dimensional space.

20. The system of claim 12, wherein the system further comprises the second computer and the second computer comprises a second wireless network interface, a second processing circuitry and a second memory, the second memory containing instructions that, when executed by the second processing circuitry, configure the second computer to:

upon receipt of the first flight plan over the wireless computer network connection via the second wireless network interface, execute the first flight plan so as to operate the first unmanned vehicle to fly in accordance with the first flight plan; and upon receipt of the second flight plan over the wireless computer network connection via the second wireless network interface, execute the second flight plan by the second computer so as to operate the first unmanned vehicle to fly in accordance with the second flight plan.

* * * * *